US012600397B2

(12) United States Patent　　　　　　(10) Patent No.: US 12,600,397 B2
Song et al.　　　　　　　　　　　　　　　(45) Date of Patent: Apr. 14, 2026

(54) BABY STROLLER CAPABLE OF BEING PUSHED AND PULLED

(71) Applicant: NINGBO MYBABY BABY&CHILDREN PRODUCTS MANUFACTURING CO., LTD., Ningbo (CN)

(72) Inventors: Haishan Song, Ningbo (CN); Zhiguo Li, Ningbo (CN)

(73) Assignee: NINGBO MYBABY BABY & CHILDREN PRODUCTS MANUFACTURING CO., LTD., Ningbo (CN)

( * ) Notice: Subject to any disclaimer, the term of this patent is extended or adjusted under 35 U.S.C. 154(b) by 439 days.

(21) Appl. No.: 18/308,689

(22) Filed: Apr. 28, 2023

(65) Prior Publication Data

US 2023/0406391 A1　　Dec. 21, 2023

(30) Foreign Application Priority Data

May 20, 2022　(CN) .......................... 202221218010.9

(51) Int. Cl.
B62B 9/20　　　(2006.01)
B62B 7/04　　　(2006.01)
(52) U.S. Cl.
CPC .............. B62B 9/203 (2013.01); B62B 7/042 (2013.01)
(58) Field of Classification Search
CPC　B62B 9/203; B62B 9/20; B62B 7/042; B62B 7/062; B62B 7/06; B62B 7/04; B62B 7/00
See application file for complete search history.

(56) References Cited

U.S. PATENT DOCUMENTS

| | | | | |
|---|---|---|---|---|
| 7,798,500 | B2 * | 9/2010 | Den Boer | B62B 7/142 |
| | | | | 280/47.38 |
| 8,448,977 | B2 * | 5/2013 | Grintz | B62B 7/08 |
| | | | | 280/47.38 |
| 8,590,919 | B2 * | 11/2013 | Yi | B62B 7/08 |
| | | | | 280/642 |
| 8,870,214 | B2 * | 10/2014 | Kane | B62B 7/062 |
| | | | | 280/47.38 |

(Continued)

FOREIGN PATENT DOCUMENTS

| | | |
|---|---|---|
| CN | 211685292 U | 10/2020 |
| CN | 217048743 U | 7/2022 |
| CN | 217374623 U | 9/2022 |

*Primary Examiner* — James M Dolak
(74) *Attorney, Agent, or Firm* — Andrew C. Cheng

(57) ABSTRACT

A baby stroller capable of being pushed and pulled comprises: a frame provided with a first locking slot and a second locking slot; a handlebar rotatably disposed on the frame and provided with a third locking slot; and a locking mechanism comprising an unlocking part, a driving part and a locking part, wherein the locking part has an end disposed in the third locking slot and an end locked in the first locking slot or the second locking slot; the unlocking part is able to drive, through the driving part, the locking part to designate from the first locking slot or the second locking slot to unlock the handlebar. The handlebar of the baby stroller is rotatably connected to the frame, such that the handlebar can be located close to front wheels or rear wheels to allow the baby stroller to be pushed or pulled for use.

9 Claims, 7 Drawing Sheets

(56)  References Cited

U.S. PATENT DOCUMENTS

| | | | | |
|---|---|---|---|---|
| 8,950,761 | B2 * | 2/2015 | Chen | B62B 9/203 |
| | | | | 280/47.38 |
| 9,193,373 | B2 * | 11/2015 | Fjelland | B62B 7/10 |
| 9,545,938 | B2 * | 1/2017 | Liu | B62B 7/083 |
| 9,630,642 | B2 * | 4/2017 | Zehfuss | B62B 9/104 |
| 9,796,405 | B2 * | 10/2017 | Li | B62B 7/062 |
| 9,884,640 | B2 * | 2/2018 | Li | B62B 7/08 |
| 9,908,551 | B2 * | 3/2018 | Ransil | B62B 9/102 |
| 10,137,922 | B2 * | 11/2018 | Yuan | B62B 9/26 |
| 10,286,941 | B2 * | 5/2019 | Li | B62B 7/062 |
| 11,247,711 | B2 * | 2/2022 | Kwok | B62B 9/102 |
| 11,685,418 | B2 * | 6/2023 | Zhang | B62B 7/083 |
| | | | | 280/642 |
| 11,938,992 | B2 * | 3/2024 | Yuan | B62B 5/064 |
| 12,145,644 | B2 * | 11/2024 | Yuan | B62B 7/062 |
| 12,246,768 | B2 * | 3/2025 | Horst | B62B 7/08 |
| 12,415,560 | B2 * | 9/2025 | Williams | B62B 7/062 |
| 12,415,561 | B2 * | 9/2025 | Hu | B62B 7/064 |
| 2018/0065655 | A1 * | 3/2018 | Leys | B62B 7/064 |

* cited by examiner

330

332    331

334

333

335

331    332

220

210

BABY STROLLER CAPABLE OF BEING PUSHED AND PULLED

BACKGROUND OF THE INVENTION

1. Technical Field

The invention relates to the technical field of baby strollers, in particular to a baby stroller capable of being pushed and pulled.

2. Description of Related Art

With the improvement of living standards, baby strollers have become indispensible for parents to take care of babies. By placing babies in baby strollers which are pushed by adults, the adults can take care of their babies conveniently, and the babies feel more comfortable and are safer.

The handlebar of existing baby strollers can be reversed. That is, when the handlebar is located on the rear side of the baby stroller, the baby stroller can be pushed for use; when the handlebar is reversed to the front side of the baby stroller, the push direction of the baby stroller is changed, and the baby stroller can be pulled on this side. However, after the handlebar of the baby stroller is adjusted (reversed), the handlebar is completely fixed or movable with respect to the frame; if the handlebar is completely movable, it will be inconvenient for users to lift the baby stroller to cross an obstacle by pulling the handlebar; if the handlebar is completely fixed, it will be inconvenient to pull the baby stroller because the angle of the handlebar cannot be adaptively adjusted according to the stress condition, the pulling distance and other factors; and the handlebar cannot be used by users of different heights, and the obstacle-crossing capacity of the baby stroller is poor.

BRIEF SUMMARY OF THE INVENTION

In view of the above defects of the prior art, the technical issue to be settled by the invention is to provide a baby stroller capable of being pushed and pulled, which is easy to lift and good in obstacle-crossing performance.

One technical solution adopted by the invention to settle the above technical issues is as follows: a baby stroller capable of being pushed and pulled comprises:

A frame provided with a first locking slot and a second locking slot;

A handlebar rotatably disposed on the frame and provided with a third locking slot; and A locking mechanism comprising an unlocking part, a driving part and a locking part, wherein the locking part has an end disposed in the third locking slot and an end locked in the first locking slot or the second locking slot; the unlocking part is able to drive, through the driving part, the locking part to designate from the first locking slot or the second locking slot to unlock the handlebar.

Further, a connecting shaft is disposed on one of the frame and the handlebar, a connecting hole is formed in the other one of the frame and the handlebar, and the connecting shaft rotatably penetrates through the connecting hole; the first locking slot, the second locking slot and the third locking slot are all arranged in an axial direction of the connecting shaft, and the locking part is movably disposed around the connecting shaft.

Further, the driving part is movably disposed around the connecting shaft and is located between the frame and the locking part; abutting blocks are disposed on the locking part in a circumferential direction of the connecting shaft, abutting grooves are formed in the driving part, and the abutting blocks movably abut against the abutting grooves.

Further, first driving slopes are disposed on the abutting blocks, second driving slopes are disposed in the abutting grooves, and the second driving slopes are able to slide along the first driving slopes.

Further, multiple first clamping blocks are disposed on the frame at intervals in a circumferential direction of the connecting hole, and the first locking slot is located between two adjacent said first clamping blocks; the locking part is a locking gear, a first gear and a second gear are disposed on the locking part, and the first gear and the second gear can be locked in the first locking slot.

Further, multiple second clamping blocks are disposed on the frame at intervals in the circumferential direction of the connecting hole, the second locking slot is disposed between two adjacent said second clamping blocks, and the second locking slot and the first locking slot are staggered with each other; the second gear can be clamped in the second locking slot and abut against the first clamping blocks.

Further, the second locking slot is wider than the second gear, so when the second gear is locked in the second locking slot, the locking part is able to rotate within a preset angle (a) to allow the handlebar to rotate within the preset angle.

Further, the preset angle (a) is from a position where the handlebar does not contact the ground to a position where the handlebar is approximately perpendicular to the ground. Further, an arc groove is formed in the frame in a circumferential direction of the connecting hole, an arc block is disposed on the locking part, and when the handlebar rotates, the arc block slides along the arc groove.

Further, the locking mechanism further comprises a pulling rope, a slot is formed in a circumferential wall of the driving part, and the pulling rope has an end inserted into the slot and an end connected to the unlocking part.

Further, the locking mechanism further comprises an elastic element, and the elastic element is disposed around the connecting shaft, and has an end abutting against the locking part as well as an end abutting against the handlebar; when the unlocking part drives, through the driving part, the locking part to designate from the first locking slot or the second locking slot, the elastic element is compressed.

Further, the frame comprises front support rods and rear support rods; when the locking part is locked in the first locking slot, the handlebar is located close to the rear support rods; when the locking part is locked in the second locking slot, the handlebar is located close to the front support rods.

Further, front wheels are disposed at bottoms of the front support rods, rear wheels are disposed at bottoms of the rear support rods, and the front wheels are universal wheels. The other technical issue adopted by the invention to settle the above technical issue is as follows: a baby stroller capable of being pushed and pulled can be pushed or pulled for use, and comprises:

A frame provided with a first locking slot and a second locking slot;

A handlebar disposed on the frame, having a pushing position and a pulling position on the frame, and capable of being rotated to the pushing position or the pulling position; and A locking mechanism comprising an unlocking part, a driving part and a locking part, wherein the locking part is disposed on the handlebar; when the baby stroller is pushed for use, the handlebar is located at the pushing position, and the locking part is locked in the first locking slot; when the baby stroller is pulled for use, the handlebar is located at the pulling position, the locking part is locked in the second locking slot and is able to rotate in the second locking slot within a preset angle a to allow the handlebar to rotate within the preset angle a; the driving part is disposed between the locking part and the frame, and the unlocking part is able to drive, through the driving part, the locking part to designate from the first locking slot or the second locking slot to unlock the handlebar. Further, the preset angle (a) is from a position where the handlebar does not contact the ground to a position where the handlebar is approximately perpendicular to the ground.

Further, when the baby stroller is pushed for use, the locking part is locked and fixed in the first locking slot, and the handlebar is locked and fixed at the pushing position.

Compared with the prior art, the invention has at least the following beneficial effects:

In the invention, the handlebar of the baby stroller is rotatably disposed on the frame and can be reversed; in normal use, the handlebar is located close to the rear wheels of the baby stroller, and the baby stroller can be pushed for use; when the baby stroller encounters an obstacle in the moving process, the handlebar can be rotated close to the front wheels, at this moment, the baby stroller can be pulled for use, the front wheels of the baby strollers can be lifted to cross the obstacle, and the handlebar can move within a certain angle to adapt to the position of the hands of users, such that the baby stroller can be lifted by users of different heights. In addition, the baby stroller is provided with the locking mechanism, which can lock the handlebar when the baby stroller is pushed or pulled for use, such that the handlebar will not fall off and touch the ground and be stained, and the structural stability of the whole baby stroller is good; and when locked in the second locking slot, the locking part can move within a certain angle in the second locking slot, such that the handlebar can move within a certain angle to be used by users of different heights, and the universality is good.

Figure 1:
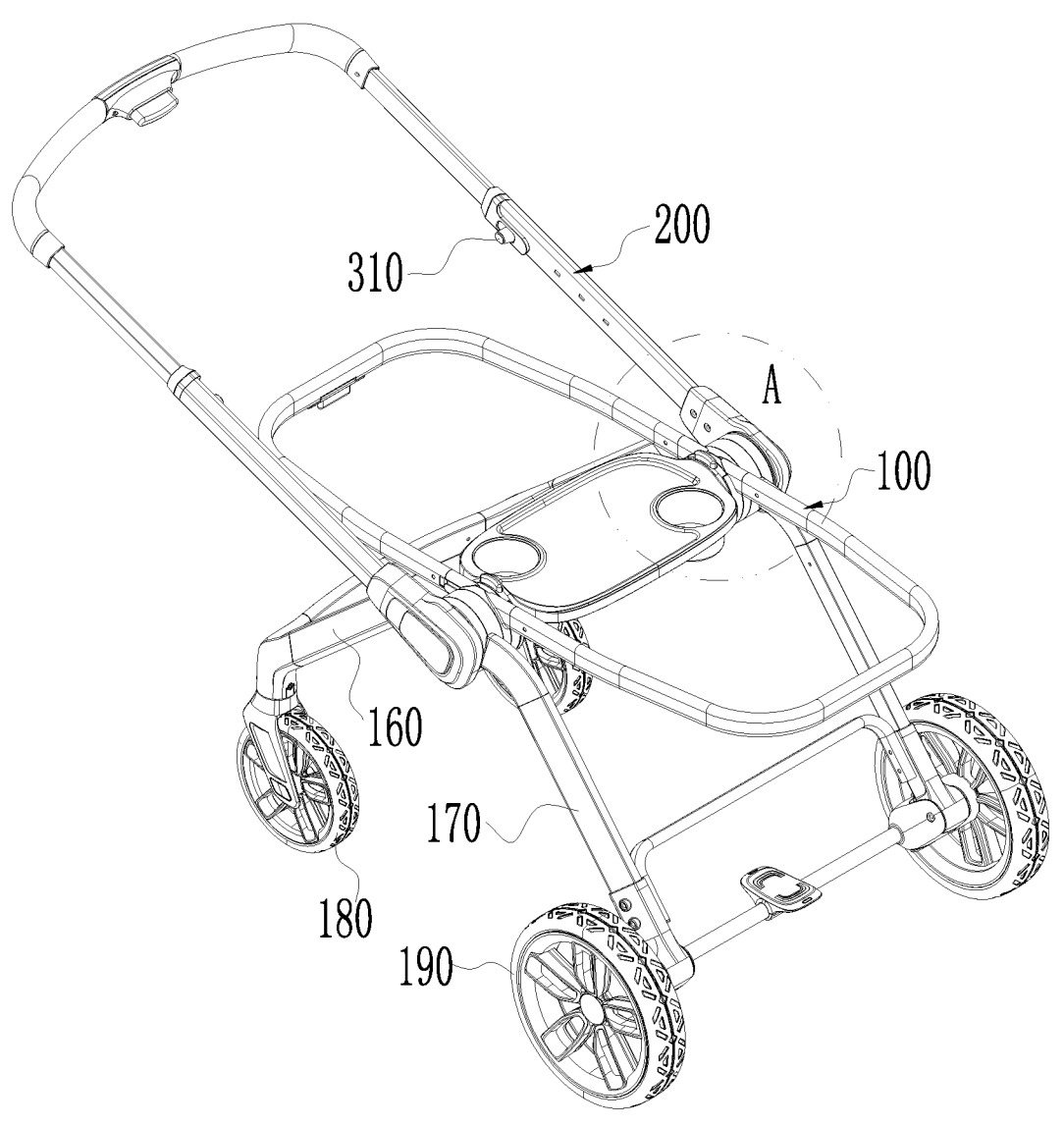
FIG. 1 is an overall structural diagram of a baby stroller capable of being pushed and pulled according to the invention.

1, baby stroller; 100, frame; 110, first locking slot; 120, second locking slot; 130, connecting hole; 131, arc groove; 140, first clamping block; 150, second clamping block; 160, front support rod; 170, rear support rod; 180, front wheel; 190, rear wheel; 200, handlebar; 210, third locking slot; 220, connecting shaft; 300, locking mechanism; 310, unlocking part; 320, driving part; 321, abutting groove; 322, second driving slope; 323, slot; 330, locking part; 331, abutting block; 332, first driving slope; 333, first gear; 334, second gear; 335, arc block; 340, pulling rope; 350, elastic element.

DETAILED DESCRIPTION OF THE INVENTION

The technical solution of the invention will be further described below in conjunction with specific embodiments and accompanying drawings of the invention, but the invention is not limited to the following embodiments.

As shown in FIG. 1-FIG. 4, and FIG. 8, a baby stroller 1 capable of being pushed and pulled mainly comprises a frame 100, a handlebar 200 rotatably disposed on the frame 100, and a locking mechanism 300. Wherein, the frame 100 is provided with a first locking slot 110 and a second locking slot 120, and the first locking slot 110 and the second locking slot 120 are staggered with each other to ensure that the handlebar 200 is at different angles when a locking part 330 is clamped in the first locking slot 110 and the second locking slot 120. The handlebar 200 is rotatably disposed on the frame 100 and is provided with a third locking slot 210. The locking mechanism 300 comprises an unlocking part 310, a driving part 320 and the locking part 330, wherein one end of the locking part 330 is disposed in the third locking slot 210 and is clamped in the third locking slot 210, and the other end of the locking part 330 is locked in the first locking slot 110 or the second locking slot 120; the unlocking part 310 is able to drive, through the driving part 320, the locking part 330 to designate from the first locking slot 110 or the second locking slot 120 to unlock the handlebar 200. When the baby stroller 1 in this embodiment is used, the handlebar 200 is rotatably connected to the frame 100, such that the handlebar 200 can be reversed to be pushed or pulled, and the baby stroller 1 can be pushed for use and can also be pulled for use. When the baby stroller 1 is pushed or pulled for use, the handlebar 200 can be locked through the locking mechanism 300 to be prevented from falling, and thus, the handlebar 200 will not be stained.

Figure 2:
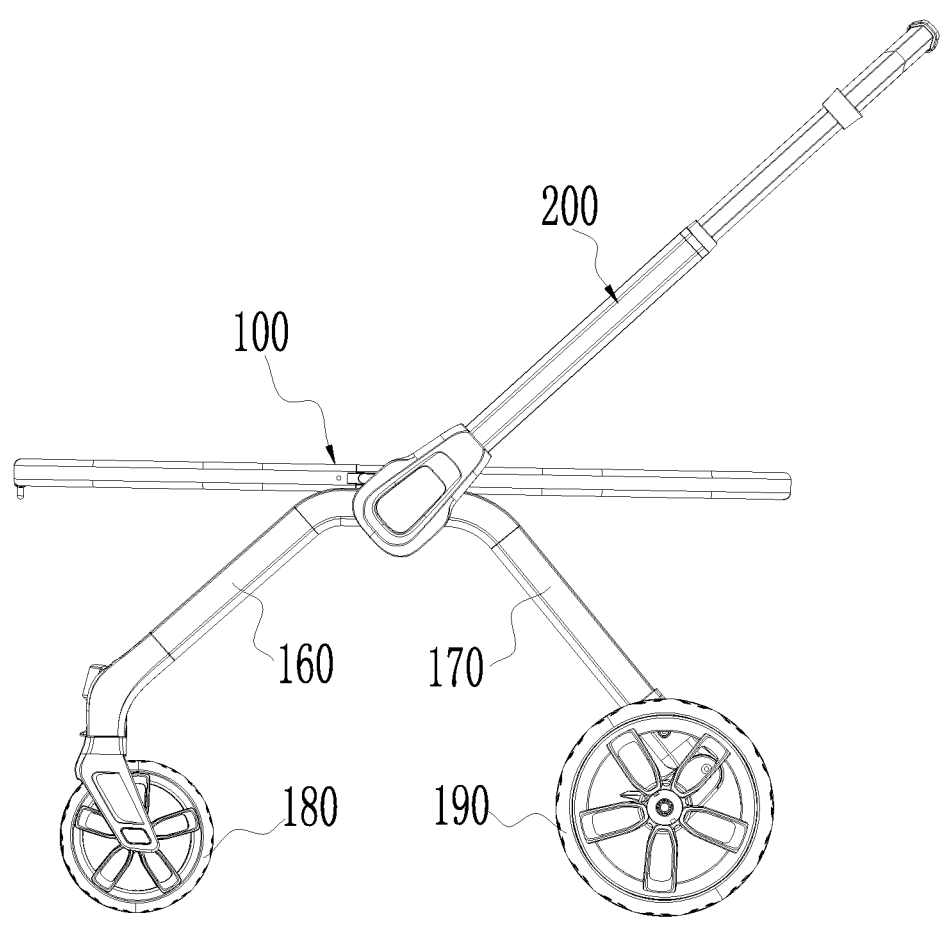
FIG. 2 is a schematic diagram of the baby stroller in a state where the baby stroller is pushed for use.
Figure 3:
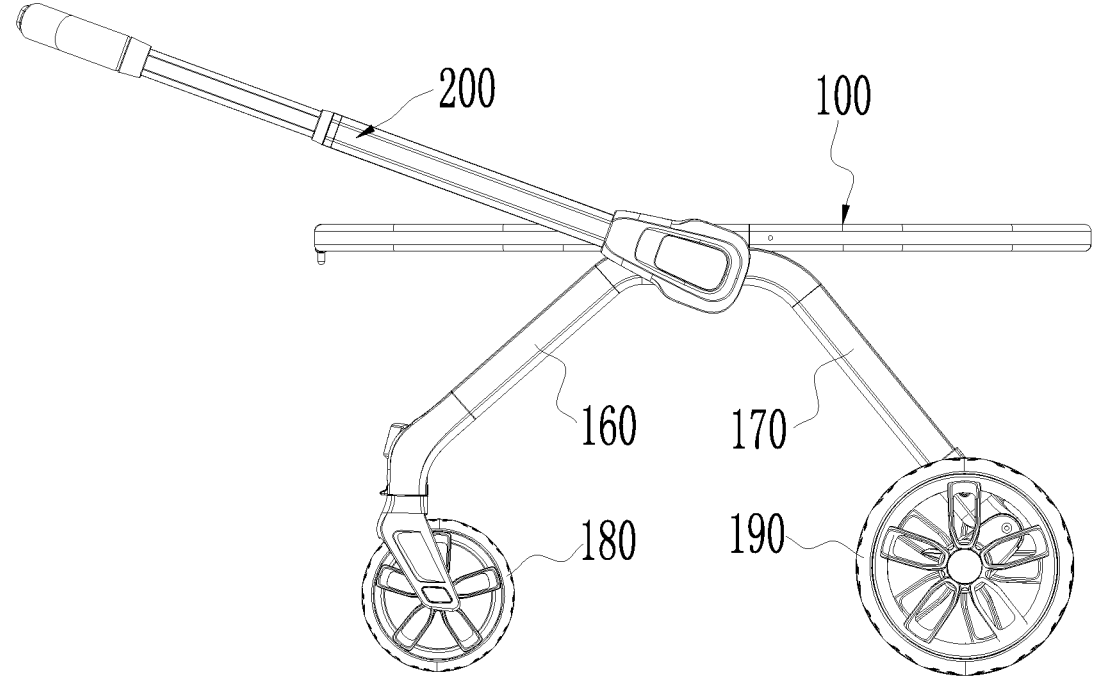
FIG. 3 is a schematic diagram of the baby stroller in a state where the baby stroller is pulled for use.
Figure 9:
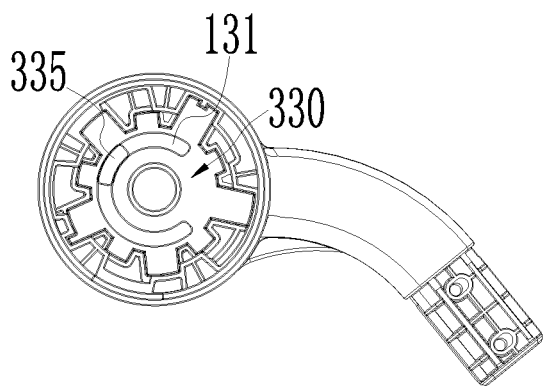
FIG. 9 is a structural diagram of the locking part locked in a first locking slot.
Figure 10:
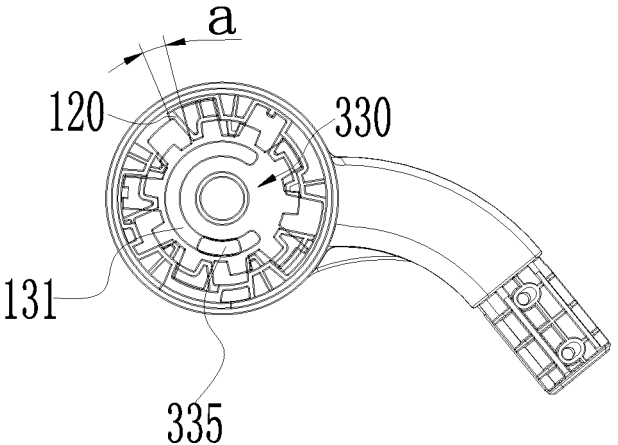
FIG. 10 is a structural diagram of the locking part locked in a second locking slot.

Wherein, a connecting shaft 220 is disposed on one of the frame 100 and the handlebar 200, a connecting hole 130 is formed in the other one of the frame 100 and the handlebar 200, and the connecting shaft 220 rotatably penetrates through the connecting hole 130. In this embodiment, the case where the connecting shaft 220 is disposed on the handlebar 200 and the connecting hole 130 is formed in the frame 100 is described in detail, and the other case where the connecting shaft 220 is disposed on the frame 100 and the connecting hole 130 is formed in the handlebar 200 will not be detailed anymore. The first locking slot 110, the second locking slot 120 and the third locking slot 210 are all arranged in an axial direction of the connecting shaft 220, that is, in a length direction of the connecting shaft 220, and the locking part 330 is movably disposed around the connecting shaft 220. In actual use, two ends of the handlebar 200 are rotatably connected to left and right sides of the frame 100 respectively, the connecting shaft 220 is disposed on the handlebar 200, the connecting hole 130 is formed in the frame 100, the locking part 330 is disposed around the connecting shaft 220, and the driving part 320 is able to drive the locking part 330 to move in the axial direction of the connecting shaft 220 to designate from the first locking slot 110 or the second locking slot 120 to unlock the handlebar 200; after being unlocked, the handlebar 200 is able to rotate between a limit position close to front wheels 180 and a limit position close to rear wheels 190, such that the baby stroller 1 can be pushed for use (as shown in FIG. 2) or be pulled for use (as shown in FIG. 1 and FIG. 3). Wherein, as shown in FIG. 2 and FIG. 9, when the handlebar 200 is located at a pushing position, the locking part 330 is locked in the first locking slot 110, engaged with the first locking slot 110, and fixed in the first locking slot 110, that is, the locking part 330 is locked and fixed in the first locking slot 110. As shown in FIG. 1, FIG. 3 and FIG. 10, when the handlebar 200 is located at a pulling position, the locking part 330 is locked in the second locking slot 120, and is able to moving within a preset angle a. Specifically, in this embodiment, the preset angle (a) is from a position where the handlebar 200 does not contact the ground to a position where the handlebar 200 is approximately perpendicular to the ground.

In this embodiment, the driving part 320 is disposed around the connecting shaft 220 and located between the frame 100 and the locking part 330, and is a ring structure on the whole; the abutting blocks 331 are disposed on the locking part 330 in a circumferential direction of the connecting shaft 220, abutting grooves 321 are formed in the driving part 320, and the abutting blocks 331 abut against the abutting grooves 321. Specifically, first driving slopes 332 are disposed on the abutting blocks 331, and second driving slopes 322 are disposed in the abutting grooves 321 and are able to slide along the first driving slopes 332. In the locked state, the first driving slopes 332 are in full contact with the second driving slopes 322 and are attached to the second driving slopes 322. When the unlocking part 310 drives the driving part 320 to rotate, top ends of the first driving slopes 332 contact top ends of the second driving slopes 322; one end of the driving part 320 abuts against frame 100, so the driving part 320 will not move in the axial direction of the connecting shaft 220, and the locking part 330 will move in the axial direction of the connecting shaft 220 to designate from the first locking slot 110 or the second locking slot 120.

Figure 4:
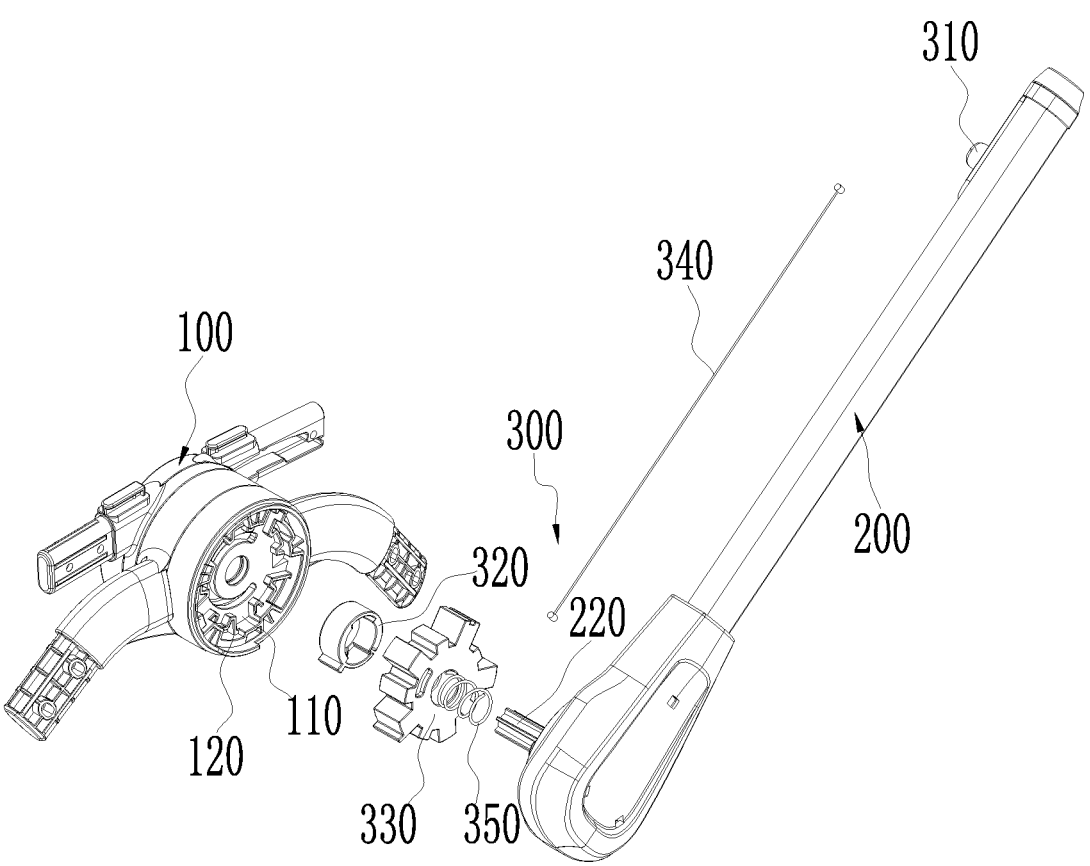
FIG. 4 is an exploded view of part A in FIG. 1.
Figure 6:
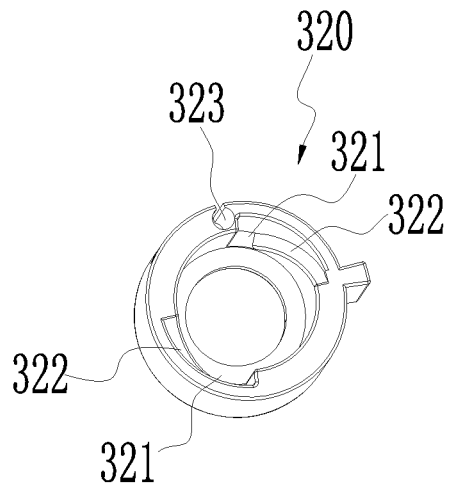
FIG. 6 is a structural diagram of a driving part.

As shown in FIG. 4 and FIG. 6, the locking mechanism 300 further comprises a pulling rope 340, a slot 323 is formed in a circumferential wall of the driving part 320, one end of the pulling rope 340 is inserted into the slot 323, and the other end of the pulling rope 340 is connected to the unlocking part 310. In actual use, the unlocking part 310 is movably disposed on the handlebar 200, and drives the driving part 320 to rotate through the pulling rope 340 when lifted. Further, the unlocking part 310 may be disposed at other positions, and may be pressed or rotated to drive the driving part 320.

Preferably, the locking mechanism 300 further comprises an elastic element 350. In this embodiment, the elastic element 350 is a tension spring, and is disposed around the connecting shaft 220, one end of the elastic element 350 abuts against the locking part 330, and the other end of the elastic element 350 abuts against the handlebar 200. Under the action of the elastic element 350, the locking part 330 always has a trend to move close to one side of the frame 100, and is able to drive the locking part 330 to return to lock the handlebar 200 after the handlebar 200 is reversed, and through the elastic element 350, the locking part 330 can be easily unlocked, and can be locked again after being unlocked. Specifically, when the unlocking part 310 drives, through the driving part 320, the locking part 330 to designate from the first locking slot 110 or the second locking slot 120, the elastic element 350 is compressed; when the handlebar 200 is reversed, the elastic force of the compressed elastic element 350 drives the locking part 330 to be locked in the first locking slot 110 or the second locking slot 120.

Figure 5:
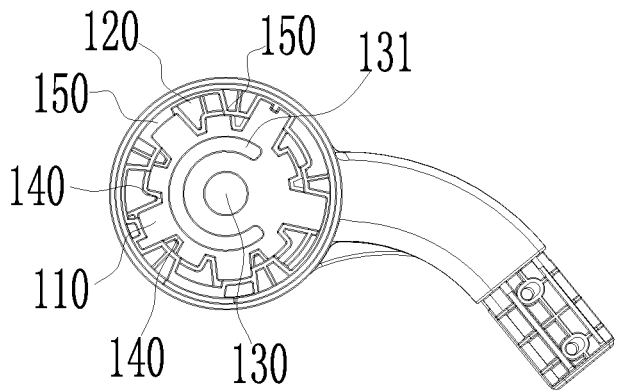
FIG. 5 is a structural diagram of a joint of a frame.
Figure 7:
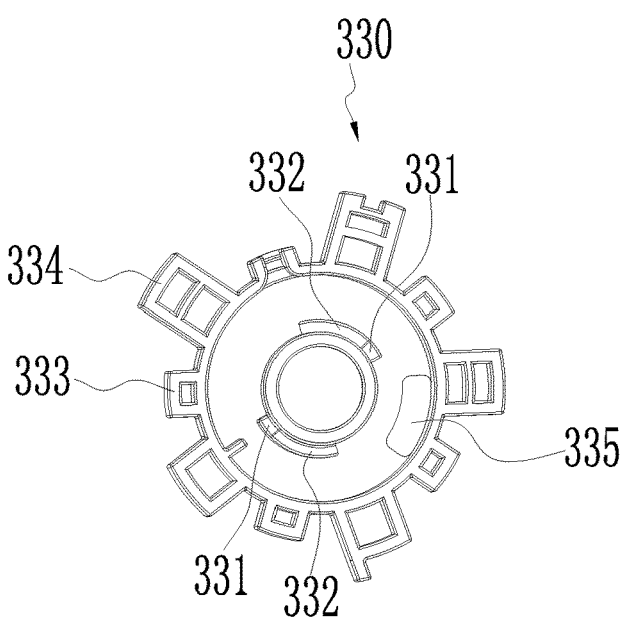
FIG. 7 is a structural diagram of a locking part.
Figure 8:
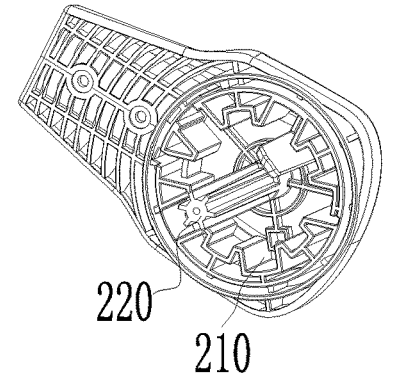
FIG. 8 is a structural diagram of a joint of a handlebar.

As shown in FIG. 4, FIG. 5 and FIG. 7, the multiple first clamping blocks 140 are disposed on the frame 110 at intervals in a circumferential direction of the connecting hole 130, and the first locking slot 110 is disposed between two adjacent first clamping blocks 140; the locking part 330 is a locking gear, a first gear 333 and a second gear 334 are disposed on the locking part 330, and the first gear 333 and the second gear 334 can be clamped in the first locking slot 110. Specifically, one side of the locking part 330 is always locked in the third locking slot 210, and when the other side of the locking part 330 is locked in the first locking slot 110, the handlebar 200 is locked to allow the baby stroller 1 to be pushed for use (as shown in FIG. 9), and the handlebar 200 is located at the pushing position.

In addition, multiple second clamping blocks 150 are disposed on the frame 100 at intervals in the circumferential direction of the connecting hole 130, the second locking slot 120 is disposed between two adjacent second clamping blocks 150, and the second locking slot 120 and the first locking slot 110 are staggered with each other; the second gear 334 may be clamped in the second slot 120 and may abut against the first clamping blocks 140. In actual use, after the handlebar 200 is reversed, the handlebar 200 drives the locking part 330 to rotate to adjust the rotation angle of the second gear 334; wherein, the second gear 334 is longer than the first gear 333, such that the second gear 334 can abut against the first clamping blocks 140 until the second gear 334 is clamped in the second locking slot 120 to lock the reversed handlebar 200.

Preferably, the second locking slot 120 is wider than the second gear 334, that is, when the second gear 334 is clamped in the second locking slot 120, a moving gap a (shown in FIG. 10) is formed between the second gear 334 and the second locking slot 120 to allow the handlebar 200 to move within a certain range, such that the handlebar will not fall and can be pulled by users of different heights to adapt to the position of the hands of users.

The frame 100 comprises front support rods 160 and rear support rods 170, front wheels 180 are disposed at bottoms of the front support rods 160, rear wheels 190 are disposed at bottoms of the rear support rods 170, and the front wheels 180 are universal wheels which can travel and rotate by 360° on the ground. In normal use, when the locking part 330 is locked in the first locking slot 110, the handlebar 200 is located close to the rear support rods 170, and at this moment, the baby stroller 1 can be pushed for use, and the handlebar 200 is located at the pushing position; when the baby stroller 1 encounters an obstacle in the moving process, the handlebar 200 is unlocked through the unlocking part 310 and is then rotated to be reversed, at this moment, the locking part 330 is located in the second locking slot 120, and the handlebar 200 is located close to the front support rods 160 and is located at the pulling position. That is, the front wheels 180 can be lifted without changing the overall direction of the baby stroller 1, to allow the baby stroller 1 to cross the obstacle.

The baby stroller 1 is used as follows: a babysitter is stands on the side close to the rear wheels 190, the handlebar 200 is located close to the rear wheels 190 and is located at the pushing position, the baby stroller 1 can be pushed for use, and in this state, the locking part 330 is locked and fixed in the first locking slot 110, the handlebar 200 is locked and fixed the pushing position, and the babysitter can push the handlebar 200 to push the baby stroller 1. When the baby stroller 1 encounters an obstacle, the unlocking part 310 is driven to drive, through the pulling rope 340, the driving part 320 to rotate, the second driving slopes 320 on the driving part 320 press against the first driving slopes 332 on the locking part 330, then the locking part 330 moves in the axial direction of the connecting shaft 220 to designate from the first locking slot 110, the elastic element 350 is compressed, and the handlebar 200 is unlocked. When the handlebar 200 is rotated to be closed to the front wheels 180 to be located at the pulling position, the baby stroller 1 can be pulled for use, and in this state, the locking part 330 is locked in the second locking slot 120 under the action of the elastic element 350 and has a small rotation space the handlebar 200 has a small rotation space, and the babysitter on the side close to the front wheels 180 can lift the handlebar 200 to lift the front wheels 180, such that the baby stroller 1 can easily cross the obstacle.

In this technical solution, the baby stroller 1 can be pushed and pulled by reversing the handlebar 200, so the baby stroller 1 can be moved easily; and when encountering an obstacle, the baby stroller 1 does not need to be rotated to enable the rear wheel 190 to be located in front on the traveling path, and the baby stroller can easily cross the obstacle by reversing the handlebar 200 to lift the front wheels 180.

It should be pointed out that all directional indications (such as "upper", "lower", "left", "right", "front" and "back") in the embodiments of the invention are merely used to explain the relative positional relations or motions between components at a certain posture (as shown in the figures), and when the specific posture changes, the directional indications will change accordingly.

It should be noted that, the descriptions such as "first", "second", or "one" in the specification is merely for a descriptive purpose, and should not be construed as indicating or implying relative importance or implicitly indicating the number of technical features referred to. So, a feature defined by "first" or "second" may explicitly or implicitly refer to the inclusion of at least one said feature. In the description of the invention, "multiple" means at least two, such as two or three, unless otherwise clearly defined. Terms such as "connect" and "fix" should be broadly understood. For example, "connect" may refer to fixed connection, detachable connection or integrated connection; or, mechanical connection or electrical connection; or, direct connection, indirect connection through an intermediate medium, or internal communication or interaction of two elements, unless otherwise clearly defined. Those ordinarily skilled in the art can understand the specific meanings of these terms in the invention as the case may be.

In addition, the technical solutions of the embodiments of the invention can be combined under the preconditions that the combinations can be implemented by those ordinarily skilled in the art. Any combinations of the technical solutions that may cause conflicts or cannot be implemented should be considered as non-existent and should not fall within the protection scope of the invention.

The specific embodiments described in this specification are merely used to explain the spirit of the invention by way of examples. Those ordinarily skilled in the art can make various amendments, supplements, or similar substitutions to these specific embodiments without departing from the spirit of the invention or exceeding the scope defined by the appended claims.

What is claimed is:

1. A baby stroller capable of being pushed and pulled, comprising:

a frame (100) provided with a first locking slot (110) and a second locking slot (120);

a handlebar (200) rotatably disposed on the frame (100) and provided with a third locking slot (210);

a locking mechanism (300) comprising an unlocking part (310), a driving part (320) and a locking part (330), wherein the locking part (330) has an end disposed in the third locking slot (210) and an end locked in the first locking slot (110) or the second locking slot (120); the unlocking part (310) is configured to drive, through the driving part (320), the locking part (330) to disengage from the first locking slot (110) or the second locking slot (120) to unlock the handlebar (200);

a connecting shaft (220) is disposed on the handlebar (200), a connecting hole (130) is formed in the frame (100), and the connecting shaft (220) rotatably penetrates through the connecting hole (130);

the first locking slot (110), the second locking slot (120) and the third locking slot (210) are all arranged in an axial direction of the connecting shaft (220), and the locking part (330) is movably disposed around the connecting shaft (220);

multiple first clamping blocks (140) are disposed on the frame (100) at intervals in a circumferential direction of the connecting hole (130), and the first locking slot (110) is located between two adjacent first clamping blocks (140) of the multiple first clamping blocks (140);

the locking part (330) is a locking gear, wherein a first gear (333) and a second gear (334) are formed as gear extensions on the locking part (330), and the first gear (333) and the second gear (334) can be locked in the first locking slot (110); and the second locking slot (120) is wider than the second gear (334), wherein when the second gear (334) is locked in the second locking slot (120), the locking part (330) is able to rotate within a preset angle (a) to allow the handlebar (200) to rotate within the preset angle.

2. The baby stroller capable of being pushed and pulled according to claim 1, wherein the driving part (320) is movably disposed around the connecting shaft (220) and is located between the frame (100) and the locking part (330); abutting blocks (331) are disposed on the locking part (330) in a circumferential direction of the connecting shaft (220), abutting grooves (321) are formed in the driving part (320), and the abutting blocks (331) movably abut against the abutting grooves (321).

3. The baby stroller capable of being pushed and pulled according to claim 2, wherein first driving slopes (332) are disposed on the abutting blocks (331), second driving slopes (322) are disposed in the abutting grooves (321), and the second driving slopes (322) are able to slide along the first driving slopes (332).

4. The baby stroller capable of being pushed and pulled according to claim 1, wherein multiple second clamping blocks (150) are disposed on the frame (100) at intervals in the circumferential direction of the connecting hole (130), the second locking slot (120) is disposed between two adjacent said second clamping blocks (150), and the second locking slot (120) and the first locking slot (110) are staggered with each other;

the second gear (334) can be clamped in the second locking slot (120) and abut against the first clamping blocks (140).

5. The baby stroller capable of being pushed and pulled according to claim 1, wherein an arc groove (131) is formed in the frame (100) in a circumferential direction of the connecting hole (130), an arc block (335) is disposed on the locking part (330), and when the handlebar (200) rotates, the arc block (335) slides along the arc groove (131).

6. The baby stroller capable of being pushed and pulled according to claim 1, wherein the locking mechanism (300) further comprises a pulling rope (340), a slot (323) is formed in a circumferential wall of the driving part (320), and the pulling rope (340) has an end inserted into the slot (323) and an end connected to the unlocking part (310).

7. The baby stroller capable of being pushed and pulled according to claim 1, wherein the locking mechanism (300) further comprises an elastic element (350), and the elastic element (350) is disposed around the connecting shaft (220), and has an end abutting against the locking part (330) as well as an end abutting against the handlebar (200);

when the unlocking part (310) drives, through the driving part (320), the locking part (330) to disengage from the first locking slot (110) or the second locking slot (120), the elastic element (350) is compressed.

8. The baby stroller capable of being pushed and pulled according to claim 1, wherein the frame (100) comprises front support rods (160) and rear support rods (170); when the locking part (330) is locked in the first locking slot (110), the handlebar (200) is located close to the rear support rods (170); when the locking part (330) is locked in the second locking slot (120), the handlebar (200) is located close to the front support rods (160).

9. The baby stroller capable of being pushed and pulled according to claim 8, wherein front wheels (180) are disposed at bottoms of the front support rods (160), rear wheels (190) are disposed at bottoms of the rear support rods (170), and the front wheels (180) are universal wheels.

\*　\*　\*　\*　\*